United States Patent [19]
Lawrence

[11] 3,879,804
[45] Apr. 29, 1975

[54] NECK STRAP
[75] Inventor: Peter Lawrence, New York, N.Y.
[73] Assignee: L. Lawrence Products, Inc., Corona, N.Y.
[22] Filed: Oct. 7, 1974
[21] Appl. No.: 512,493

[52] U.S. Cl. .................................. 24/3 C; 351/157
[51] Int. Cl. ........................................... A44b 21/00
[58] Field of Search ........................... 24/3 C, 3 D; 351/155–157

[56] References Cited
UNITED STATES PATENTS

| | | | |
|---|---|---|---|
| 2,648,255 | 8/1953 | Pendelton | 24/3 C |
| 2,819,650 | 1/1958 | Seron | 24/3 C |
| 2,858,733 | 11/1958 | Lodewick et al. | 24/3 C |
| 3,397,026 | 8/1968 | Spina | 351/157 |
| 3,588,960 | 6/1971 | McClellan et al. | 24/3 C |

Primary Examiner—Geo. V. Larkin
Attorney, Agent, or Firm—Charles E. Temko

[57] ABSTRACT

A neckstrap for supporting eyeglasses when not in use upon a wearer by engaging the temple elements of the frame thereof. The device is formed entirely or in substantial part of a synthetic resinous material having a durometer value ranging from 65 to 85, and includes an elongated strap member and a pair of orificed members through which the strap member is passed thereby forming looped ends which are tightened upon the frame of the eyeglass to be frictionally retained by the expansion of the strap member within a respective orifice. The device is also suitable for retaining goggles in adjustable operative position upon the head of a wearer. A second embodiment employs loops of synthetic resinous material in conjunction with a metallic loop retaining member.

6 Claims, 8 Drawing Figures

PATENTED APR 29 1975  3,879,804
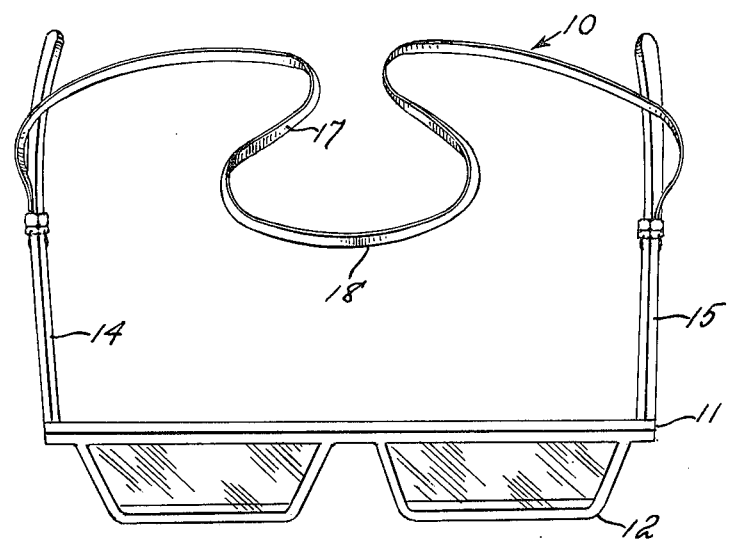
FIG.1
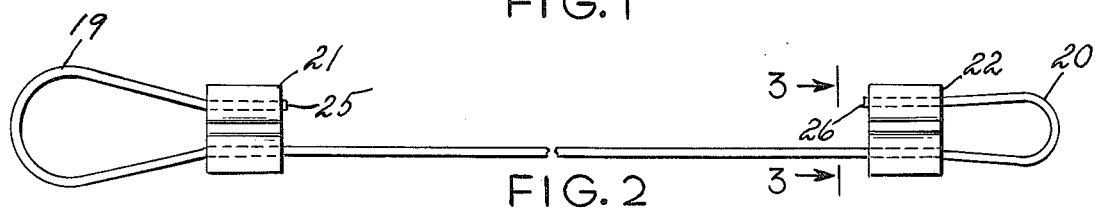
FIG.2
FIG.4
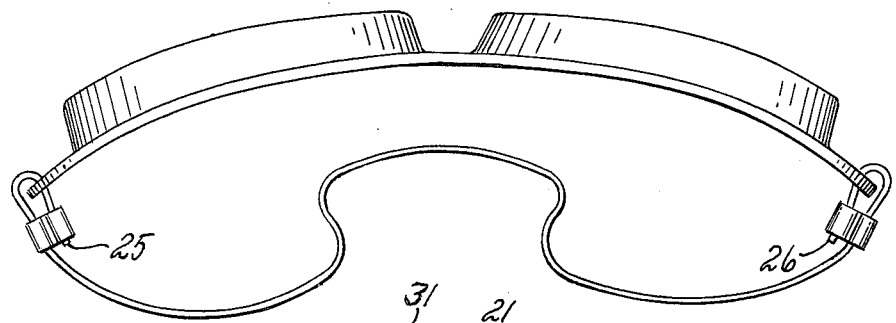
FIG.3
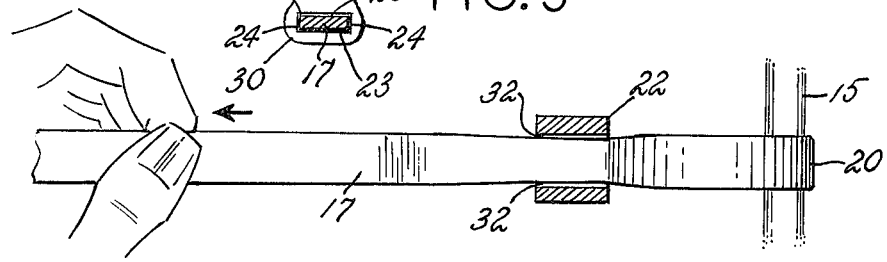
FIG.5
FIG.6
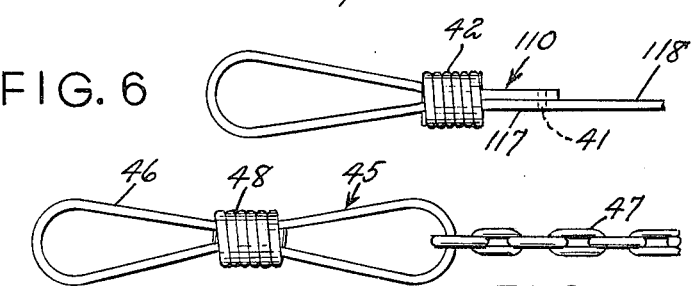
FIG.7
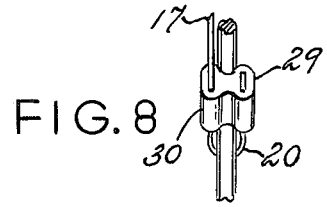
FIG.8

NECK STRAP

BACKGROUND OF THE INVENTION

This invention relates generally to the field of supportive neckstraps, and more particularly to an improved neckstrap for supporting eyeglasses or spectacles upon the body of a wearer ready for instant use when desired. Devices of this general type are well known in the art, and the invention lies in the specific constructional details permitting lowered cost of manufacture, ease of use, and improved durability. Prior art devices have been manufactured principally from rubber-like material which lacks durability, and which are relatively unattractive in appearance. In addition, they have failed to offer a proper purchase upon the frame of the spectacles, as the materials from which the device are made lose substantial resiliency.

SUMMARY OF THE INVENTION

Briefly stated, the invention contemplates provision of a neckstrap of the class described manufacture in whole or in substantial part of synthetic resinous materials such as polyvinyl chloride of a durometer ranging between 65 and 85, the device including a strap member which, when placed in tension, will attenuate to reduce the effective cross-sectional area thereof permitting adjustment within a loop retaining member through which the strap member passes to permit tightening of the loop about a portion of the spectacle or eyeglass. When the device is used to support a pair of goggles, the loops are formed to pass through corresponding slots in the goggles body, and the size of the loop is varied to permit adjustment to individual head size when the goggles are worn. In one embodiment, the loop forming members are made of coiled wire to function in a similar fashion.

BRIEF DESCRIPTION OF THE DRAWINGS

In the drawings, to which reference will be made in the specification, similar reference characters have been employed to designate corresponding parts throughout the several views.

FIG. 1 is a view in perspective of a first embodiment of the invention in installed condition upon a pair of spectacles.

FIG. 2 is a view in elevation of the first embodiment in detached condition.

FIG. 3 is a sectional view as seen from the plane 3—3 in FIG. 2.

FIG. 4 is a view in elevation showing the first embodiment on a pair of goggles.

FIG. 5 is a perspective view, partially in section, showing the tightening of the device upon a spectacle temple element.

FIG. 6 is a fragmentary elevational view of a second embodiment of the invention.

FIG. 7 is a fragmentary elevational view of a third embodiment of the invention.

FIG. 8 is a fragmentary view in perspective corresponding to the right-hand portion of FIG. 5.

DETAILED DESCRIPTION OF THE DISCLOSED EMBODIMENTS

In accordance with the first embodiment of the invention, the device, generally indicated by reference character 10, is illustrated by FIG. 1 in the drawing in installed condition upon a pair of spectacles 11 of conventional type including a front element 12 supporting through hinges (not shown) a pair of foldable temple elements 14 and 15. The device 10 includes a length of material forming a main strap member 17 including a medially disposed portion 18 and first and second loops 19 and 20, respectively, formed by loop retaining elements 21 and 22. As best seen in FIG. 3, the strap member 17 is of rectangular cross section bounded by a pair of wider surfaces 23 and a pair of narrower surfaces 24 extending to left and right hand ends 25 and 26, respectively. Both the strap member and the retaining members are most preferably formed from polyvinyl chloride having a durometer ranging between 65 and 85, for reasons which will more fully appear in the progress of the disclosure.

As best seen in FIGS. 2 and 3, the retaining members 21-22 are of "figure 8" configuration, including first and second strap engaging portions 29 and 30, each forming a through opening as at 31 and 32.

As seen in FIG. 5, the strap member 17 is anchored at the ends thereof in one of the openings of a retaining member by cementitous means, or more conveniently by solvent welding. The strip member forms a loop by slidably passing through the other opening, and during installation, the size of the loop formed thereby is adjusted to firmly grip the frame of the spectacles. In relatively unstressed condition, the cross sectional area of the strip 17 is equal to or slightly greater than the cross sectional area of the corresponding opening in the retaining member, so as to form a frictional engagement there between which is not accidentally dislodged. The loop can be enlarged or diminished by exerting tension on the strap member 17 in the desired direction, as shown in FIG. 5, at which time that portion of the strap member which is disposed within the opening in the retaining member will attenuate and reduce the effective cross sectional area to a point where it will easily slide within the opening. When proper adjustment has been obtained, the release of the tension will allow the strip member to return to unstressed condition by virtue of elastic memory, and the gripping action is resumed.

Turning now to the second embodiment of the invention illustrated in FIG. 6, parts corresponding to those of the principal embodiment have been designated by similar reference characters with the additional prefix "1".

The second embodiment 110 differs from the first embodiment in the use of rivet means 41 to form loops at the end of the strap member 117, and the substitution of retaining members, one of which is indicated by reference character 42 in the form of a coil of wire defining an opening sufficiently small to grip the strap member in a manner similar to that in the first embodiment. The device is installed upon a pair of spectacles by inserting the temple elements into the loop, and diminishing the effective size of the loop by sliding the coil of wire leftwardly as seen in FIG. 6, while exerting tension on the medial portion 118 of the strap member 117.

In the third embodiment illustrated in FIG. 7, and generally indicated by reference character 45, a constrictive loop 46 is formed by extruding a relatively large diameter tube, and cutting the same transversely to form an endless loop, one end of which is engaged by a link chain 47 or similar structure. The retaining member 48 is similar to that in the second embodiment, and is employed in a similar fashion.

In each case, adjustability of the loop with respect to the maintaining member is accomplished by placing tension upon the former to reduce the effective cross-sectional area of same in the location of the retaining member, and permit relative movement there between. The attenuation of the strap member is progressive, the stretch taking place as illustrated in FIG. 5 as a given continuous segment passes through the retaining member, and immediately after passing through the opening of this member, the strap member tends to return to its normal unstressed condition. Unlike a conventional rubber band, the attenuation is not distributed along the entire length of the tensed segment.

I wish it to be understood that I do not consider the invention limited to the precise details of structure shown and set forth in this specification, for obvious modifications will occur to those skilled in the art to which the invention pertains.

I claim:

1. A neckstrap or similar article defining adjustable closed loops at each end thereof comprising: an elongated strap member formed at least partially from a resinous material of durometer value ranging from 65 to 85, at least one retaining member defining an opening through which one end of said strap member passes to form one of said closed loops; said strap member having an unstressed cross-sectional area which is slightly greater than the area of the corresponding opening in said retaining member, whereby said strap member is resiliently frictionally gripped therein; said loop formed thereby being adjustable by exerting tension upon said strap member to result in attenuating that portion of the strap member lying within said opening permitting relative motion there between, the release of tension serving to permit the attenuated portion to expand to be again retained in relatively fixed position.

2. Structure in accordance with claim 1, including a pair of retaining members, one for each closed loop.

3. Structure in accordance with claim 1, in which said strap member and retaining members are formed from polyvinyl chloride.

4. Structure in accordance with claim 1, in which said retaining members are in the form of short lengths of spirally coiled wire.

5. Structure in accordance with claim 1, in which said loops are formed as endless integral units.

6. Structure in accordance with claim 1, in which said strap member and said openings in said retaining members are of rectangular configuration.

* * * * *